US009009193B2

(12) United States Patent (10) Patent No.: US 9,009,193 B2
Callery et al. (45) Date of Patent: Apr. 14, 2015

(54) TECHNIQUES PROVIDING A SOFTWARE FITTING ASSESSMENT

(75) Inventors: Matthew J. Callery, Shrub Oak, NY (US); Michael Desmond, White Plains, NY (US); Sophia Krasikov, Katonah, NY (US); Harold L. Ossher, South Salem, NY (US); Edith Schonberg, New York, NY (US); Harini Srinivasan, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 13/611,114

(22) Filed: Sep. 12, 2012

(65) Prior Publication Data
US 2014/0052758 A1 Feb. 20, 2014

Related U.S. Application Data

(63) Continuation of application No. 13/588,631, filed on Aug. 17, 2012, now abandoned.

(51) Int. Cl.
*G06F 17/30* (2006.01)
*G06F 9/44* (2006.01)
*G06Q 10/06* (2012.01)

(52) U.S. Cl.
CPC .............. *G06F 8/36* (2013.01); *G06Q 10/0631* (2013.01)

(58) Field of Classification Search
None
See application file for complete search history.

(56) References Cited

U.S. PATENT DOCUMENTS

| 6,195,643 | B1 | 2/2001 | Maxwell |
| 7,860,765 | B2* | 12/2010 | Bouchard ....................... 705/35 |
| 2004/0123272 | A1* | 6/2004 | Bailey et al. .................. 717/125 |
| 2004/0243968 | A1* | 12/2004 | Hecksel ........................ 717/100 |
| 2005/0165600 | A1 | 7/2005 | Kasravi et al. |
| 2007/0051791 | A1* | 3/2007 | Bouchard ..................... 235/375 |
| 2007/0073754 | A1 | 3/2007 | Friedlander et al. |
| 2007/0168907 | A1* | 7/2007 | Iborra et al. .................. 717/100 |
| 2008/0163156 | A1* | 7/2008 | Grey ............................. 717/101 |
| 2010/0122238 | A1* | 5/2010 | Kannan et al. ................ 717/123 |
| 2010/0262471 | A1* | 10/2010 | Hughes ........................... 705/11 |
| 2010/0312648 | A1* | 12/2010 | Gerome et al. ............ 705/14.66 |
| 2011/0119193 | A1* | 5/2011 | McLees et al. ............... 705/301 |
| 2011/0119194 | A1* | 5/2011 | McLees et al. ............... 705/301 |
| 2011/0231817 | A1 | 9/2011 | Hadar et al. |

(Continued)

OTHER PUBLICATIONS

Anonymous; "Method and Apparatus for Detecting the Build Including Specified Requirements"; http://priorartdatabase.com/IPCOM/000000215260; Feb. 23, 2012. 9 pages.

(Continued)

*Primary Examiner* — Hung Le
(74) *Attorney, Agent, or Firm* — Harrington & Smith

(57) ABSTRACT

Techniques are presented for providing a software fitting assessment. The techniques may be performed by methods, apparatus, and/or computer program products. The techniques include automatically matching on a computer system one or more specified requirements for a project with one or more software functions stored in a repository. The automatically matching includes mining the repository in order to match requirements. The repository includes software functions, requirements accumulated from previous projects, and results of stored matches between the software functions and the requirements accumulated from previous projects. The techniques include outputting by the computer system one or more results of the matching.

24 Claims, 6 Drawing Sheets

(56) References Cited

U.S. PATENT DOCUMENTS

2012/0191740 A1    7/2012  Moehrle
2012/0210312 A1*   8/2012  Ma et al. ................ 717/170
2012/0233583 A1*   9/2012  Horovitz .................. 717/100
2012/0278900 A1*  11/2012  Sebald ...................... 726/28

OTHER PUBLICATIONS

Bryan, W.L.-et al.; "Auditing Throughput the Software Life Cycle: A Primer"; http://www.ip.com/pubview/IPCOM000131480D.; Nov. 11, 2005. pp. 57-64.

* cited by examiner

TECHNIQUES PROVIDING A SOFTWARE FITTING ASSESSMENT

CROSS-REFERENCE TO RELATED APPLICATION

This is a continuation of U.S. patent Ser. No. 13/588,631, filed on Aug. 17, 2012, which is incorporated by reference in its entirety.

BACKGROUND

This invention relates generally to requirements for projects and, more specifically, relates to automated fitting of requirements to projects.

There are numerous requirements tools on the market. These tools focus on simplifying the tasks of gathering, tracking, modeling and tracing requirements through a software lifecycle. These tools do not cover the problem of evaluating whether a set of requirements can be satisfied by functions available in specific software products. Performing this evaluation can be a costly step for an enterprise, whether the job is done internally or by employing consulting services. Matching the requirements of a given project against the variety of functions offered by software products under consideration is a job that's usually done manually. The tools typically used are white boards, spreadsheets, word documents, presentations and product documentation. One or more employees have to create and analyze this information in order to select an appropriate software product for a set of requirements. Any degree of automation can bring a competitive advantage to those who use the automation.

SUMMARY

Techniques are presented for providing a software fitting assessment. The techniques may be performed by methods, apparatus, and/or computer program products. The techniques include automatically matching on a computer system one or more specified requirements for a project with one or more software functions stored in a repository. The automatically matching includes mining the repository in order to match requirements. The repository includes software functions, requirements accumulated from previous projects, and results of stored matches between the software functions and the requirements accumulated from previous projects. The techniques include outputting by the computer system one or more results of the matching.

DETAILED DESCRIPTION

As indicated above, evaluating whether a set of requirements can be satisfied by functions available in specific software products is currently a laborious process carried out by employees. The instant invention provides automated techniques for determining whether a set of project requirements can be satisfied by functions available in specific software products. Two features of an exemplary embodiment of the invention are the following: 1) a knowledge-based automatic matching of project requirements and knowledge sources (e.g., software functions, requirements accumulated from previous projects, and results of stored matches between the two); and 2) continuous building of a repository of knowledge. The first feature, on its own and in combination with the second feature, is not a component of any known requirements tools.

The exemplary embodiments herein will be presented in terms of a proposed use. The proposed use is merely for ease of exposition, however, and the exemplary embodiments are not to be limited to this use.

Figure 1A:
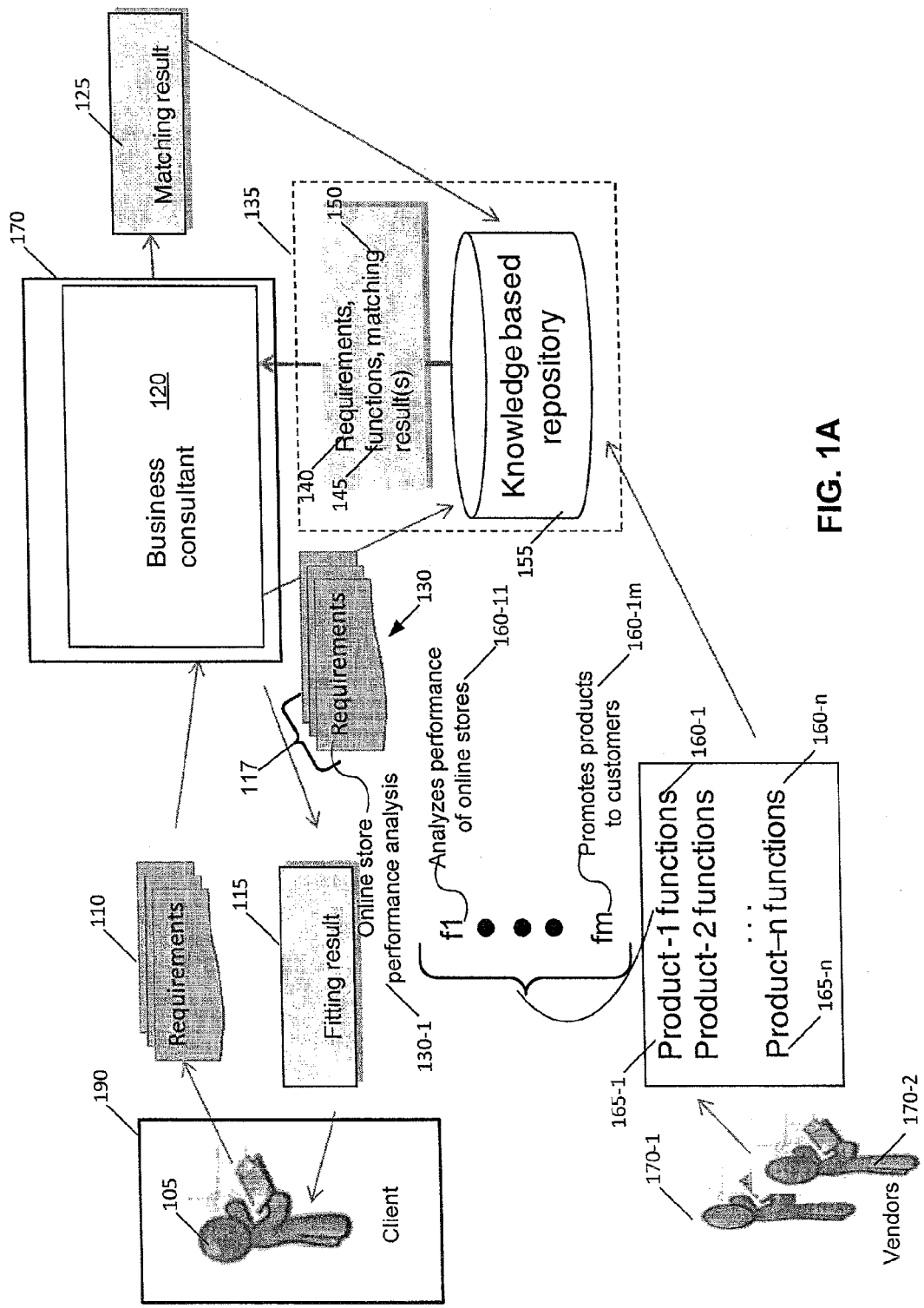
FIG. 1A is a block diagram of an example of a system for matching a given project's requirements with knowledge sources in accordance with an exemplary embodiment of the instant invention.

Turning to FIG. 1A, a block diagram is shown of an example of a system for matching a given project's requirements with knowledge sources. A consulting company 170 (here, mainly represented by the business consultant 120) possesses a broad knowledge of web commerce software products, as well as specific knowledge of the retail industry. This consultant company 170 is working with a retailer 190 (represented mainly by client 105) that plans to set up a web store. The retailer 190 wants its store to have the following: a catalog, order and content management, member management and a marketing subsystems, as well as smooth integration with its backend systems. The retailer 190 gathers its needs for a project into a set of requirements 110, which are then presented to the consulting company 170.

Setting up a web store requires a unique combination of different software products and product functions. The functions can include the following: processing a customer's registration with the store, providing a catalog of products, accepting customer orders, processing orders and shipping, promoting products to customers, and analyzing the store's performance. In order to assess how well the consultant's solutions fit the retailer's requirements 110, the consulting company 170 uses a software fitting assessment tool 135 embodying exemplary embodiments of this invention. The business consultant 120 provides requirements 130 to the software fitting assessment tool 135. The requirements 130 correspond to a new project 117. The requirements 130 may be the same as or different from the requirements 110 provided by the client 105, e.g., based on the experience of the business consultant 120. In spite of the fact that requirements 110 can also be expressed in diagrams, typically this is the case with UI requirements, in the instant disclosure, only requirements in textual form are examined.

In an exemplary embodiment, the software assessment tool 135 maintains an up-to-date repository 155 including functions 160 from a set (numbered "n") of software products 165 used in retail solutions, as well as requirements accumulated from previous projects, which are associated with those functions 160. Additional detail regarding the knowledge-based repository is provided below. In this example, each vendor 170 (of which two are shown, vendors 170-1 and 170-2) inputs functions 160 for each software product 165. Each software product 165 is described by a set (one or more) of functions 160. An example is shown where the set of functions 160-1 includes functions f1 160-11 to fm 160-1m. There may therefore be a one-to-many mapping from a software product 165 (e.g., 165-1) to functions 160. That is, each software product 165 may be described using one to many functions 160. Further, there may also be a one-to-many mapping from a function 160 to software products 165, such that a single function 160 is described for multiple software products 165.

A function 160 can be expressed by a simple text description of that function 160, as well as with references to different artifacts such as product documentation, presentations, customization details, and configurations. Mining these artifacts increase the possibility of finding a match, and the accuracy of a match, and provides additional information to the consultant 120.

When a retailer submits its requirements 110 to the consulting company 170, the consultant 120 loads suitable requirements 130 into the tool 135. A new project is opened and the matching process begins by the software fitting assessment tool 135. The software fitting assessment tool 135 performs a number of actions as described below and in this example produces the following results: requirement(s) 140, functions 145 that correspond to the requirements 140, and matching result(s) 150. The requirements 140 will typically be the same as requirements 130, but there may be some requirements 140 that are similar to but do not exactly match the requirements 130. The matching results 150 allow corresponding product functions 160 of products 165 to be determined, and may be text names of the product functions 160 of products and/or links to the products and the like. The matching results 150 may include one-to-many or one-to-one mappings of requirements 140 to functions 145. For example, a customer's requirement, "Free shipping for purchases over X dollars" matches the function "Shipping promotions" in vendor A's software product, called "Instant Web Store". It also matches the function "shipping discounts" in vendor B's software product "Virtual Counter.". The consultant 120 then supplies a fitting result 115 to the client 105. The fitting result 115 may be only the matching results(s) 150 (e.g., a list of product functions 160 of products 165 meeting the requirements 110), but may also include corresponding requirements 110.

As described below, there may be instances where there is no matching result between a requirement 130 and a function 160 (and a corresponding product 165). In that case, the software fitting assessment tool 135 can request the business consultant 120 provide such a match as matching result 125. The matching result 125 in this case provides a requirement 130 and one or more corresponding functions 160 and also may provide one or more corresponding products 165.

In this example, one of the requirements 130-1 is input as the text "Online store performance analysis". The functions 160 include the text "Analyzes performance of online stores" in function 160-11, and the text "Promotes products to customers" in the function 160-1m.

Figure 1B:
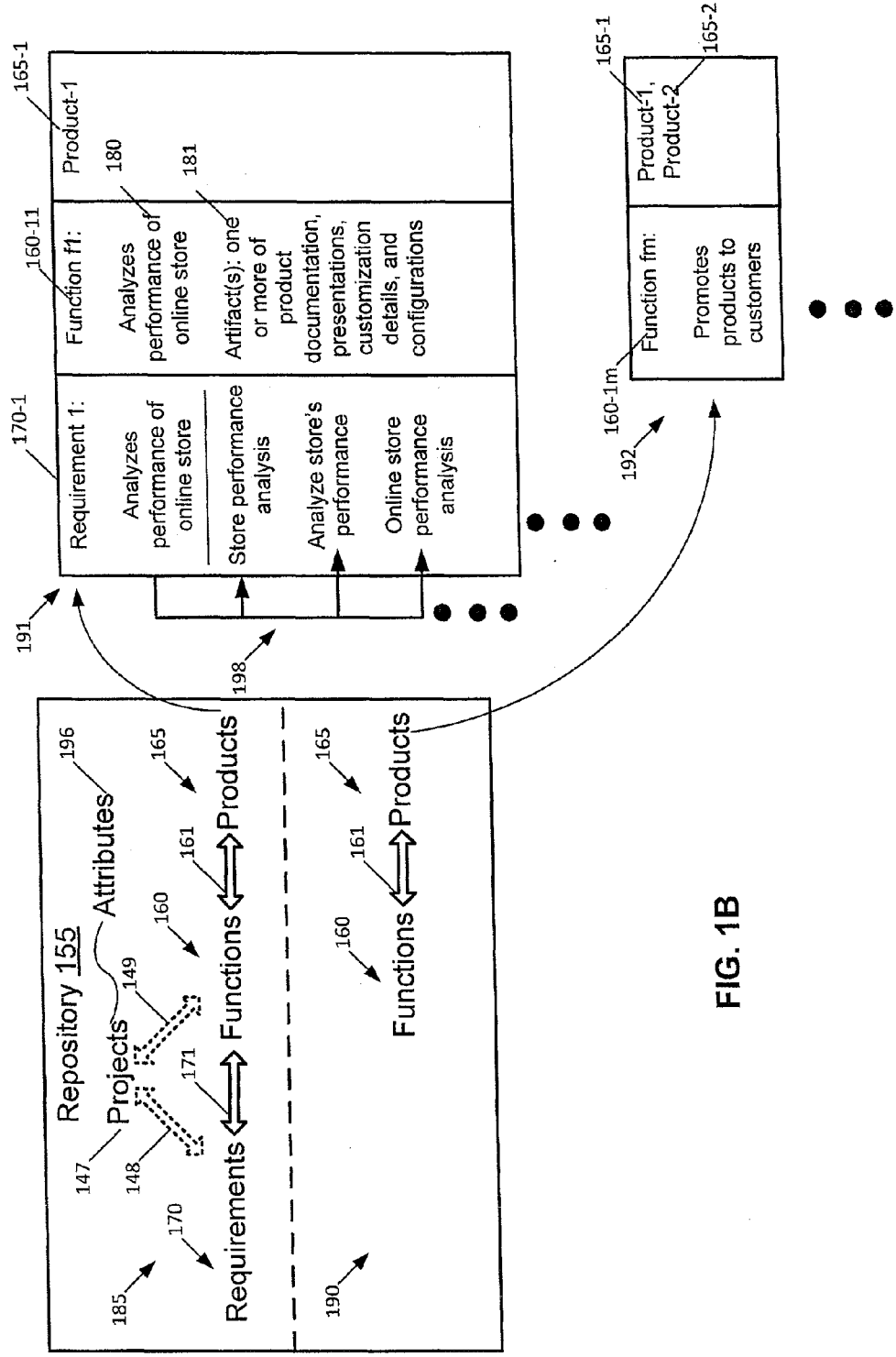
FIG. 1B provides examples of a knowledge based repository and entries in the repository.

As shown in FIG. 1B, the knowledge based repository 155 includes a portion 185 where requirements 170 are mapped 171 to corresponding functions 160. Furthermore, the functions 160 are mapped 161 to products 165. That is, portion 185 includes requirements 170 accumulated from previous projects, and results of stored matches between the software functions and the requirements accumulated from previous projects. In this example, the results of the stored matches include the mappings between the requirements 170 and the software functions 160. The knowledge based repository 155 may also include one or more mappings to projects 147. For instance the requirements 170 may be mapped 148 to projects 147, and/or the functions 160 may be mapped 149 to projects 147. This could allow, for instance, specified requirements 130 (and/or functions 160 corresponding to the specified requirements 130) for a new project 117 to be compared against requirements 170 (and/or corresponding functions 160) for previously stored projects 147. As described below, attributes 196 of the projects 147 may also be stored.

The knowledge based repository 155 also includes a portion 190 where functions 160 have not been mapped to requirements 170, but the functions 160 are mapped to products 165. Thus, the portion 160 has functions 160 that have not yet been matched to requirements 170 (e.g., or 130) of projects.

The mappings 171, 161 may take many forms, but for ease of exposition, the portions 185 and 190 of the knowledge based repository 155 are represented in tabular format as tables 191 (corresponding to a single entry in the portion 185) and 192 (corresponding to a single entry in the portion 190). In the example of the table 191, a requirement 170-1 is represented by the text "Analyzes performance of online store", and a corresponding function 160-11 is represented at text 180, "Analyzes performance of online store". A corresponding product 165 is "Product-1" 165-1. The function 160-11 may also be represented by artifact(s) 181, which include in this example one or more of product documentation (e.g., of the software product having the functions), presentations (e.g., about the software product having the function), customization details (e.g., of the software product having the function), and configurations of the software product, as non-limiting examples. Because requirements 170, if input as text, may take many equivalent text forms, there are references 198 to additional text forms including "Store performance analysis", "Analyze store's performance", and "Online store performance analysis". Requirements are associated with a project and stored in the knowledge based repository. If a match between a requirement and software function(s) is found, the cross-references (illustrated as mappings 171) between the requirement and function(s) is created and stored. In this way, a matching function and a requirement become linked. As a result, all matching functions for a requirement can be queried, and vise versa. For a function, all matching requirements (with references to projects) can be queried.

In this example of the table 192, the function fm 160-1m is represented by the text "Promotes products to customers" and this function 160-1m corresponds to the products "Product-1" 165-1 and "Product-2" 165-2.

Figure 2A:
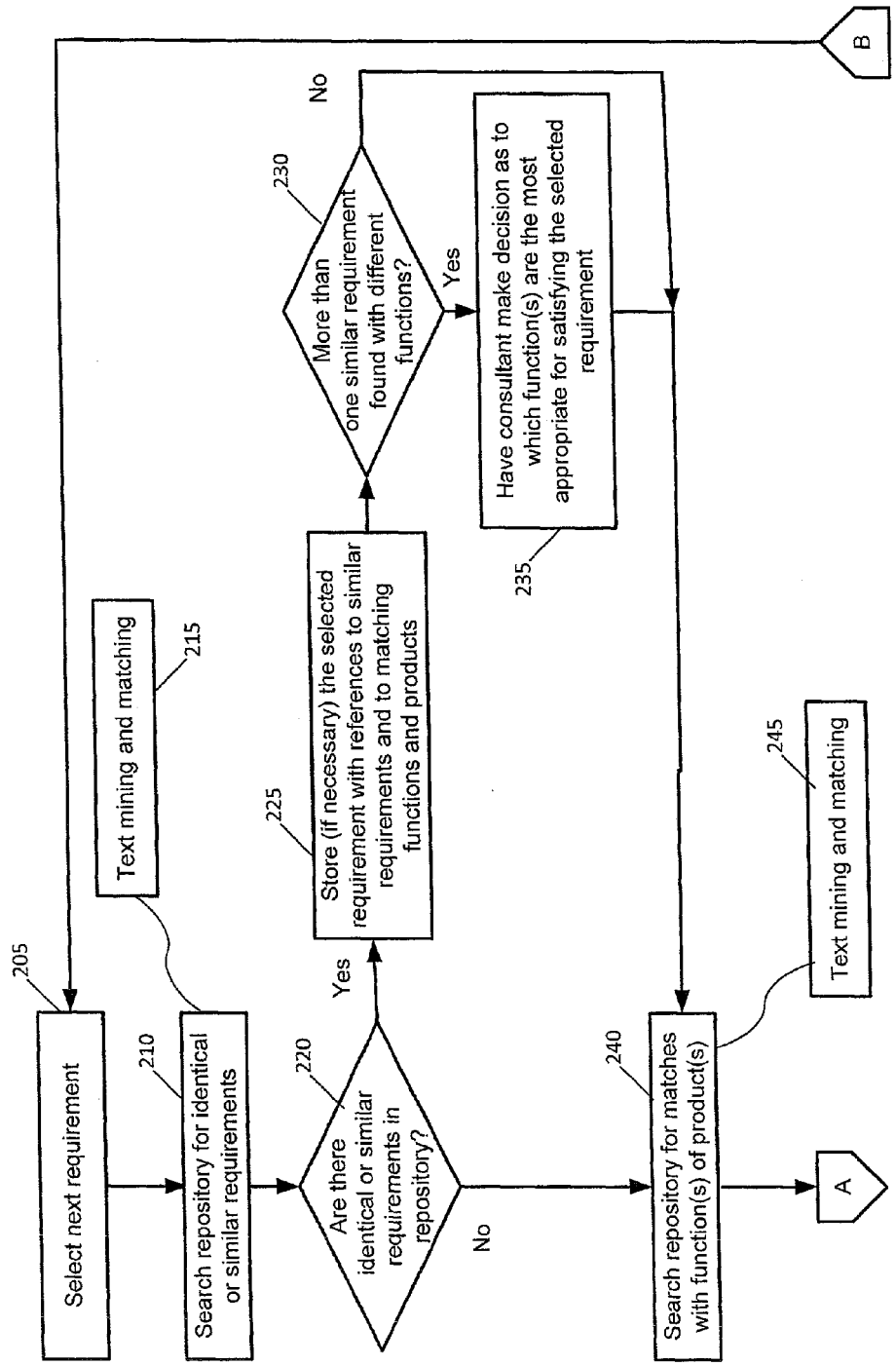
FIGS. 2A and 2B are flowcharts for providing a software fitting assessment.
Figure 2A:
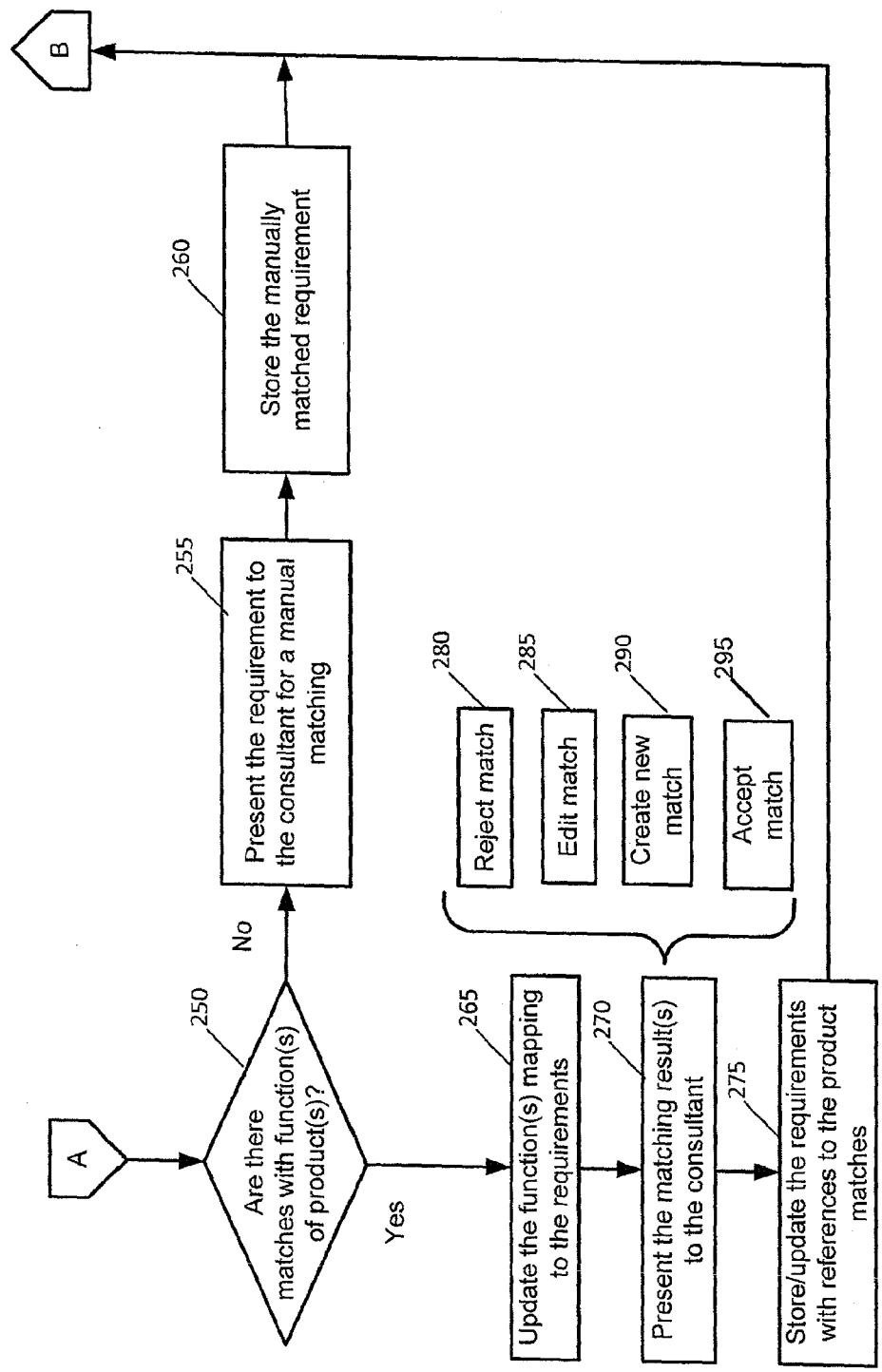
Figure 2B:
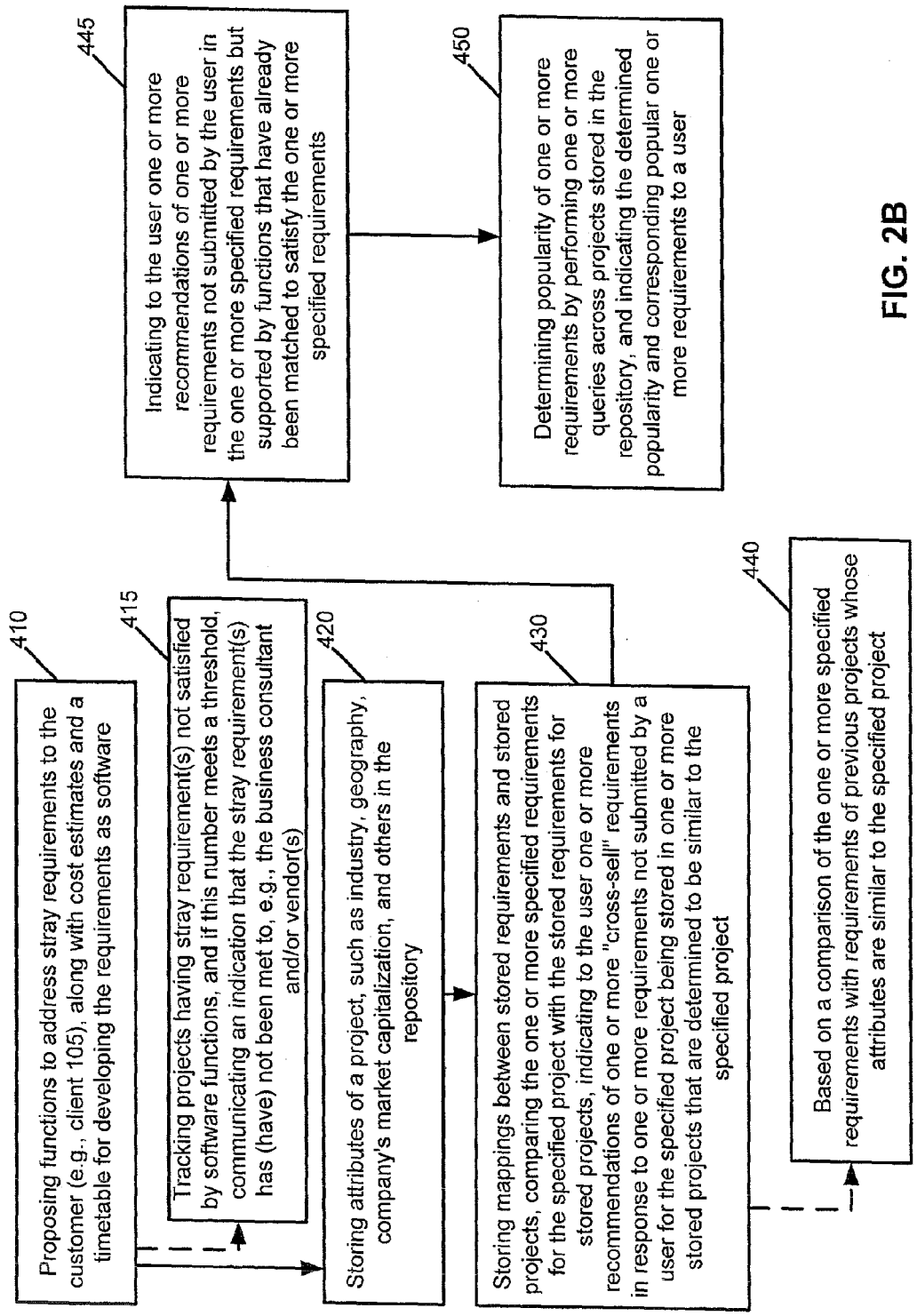

Some examples are now presented in reference to FIGS. 1A, 1B, 2A, and 2B. FIG. 2A is a flowchart for providing a software fitting assessment, as performed, e.g., by a software fitting assessment tool 135. FIG. 2A is an example of a "main" exemplary set of operations for providing a software fitting assessment. FIG. 2B, described below, includes a set of exemplary operations that are in addition to the set of operations in FIG. 2A.

In block 205 of FIG. 2A, the "next" requirement 130 is selected. For instance, the first requirement 130-1 of "Online store performance analysis" may be selected. For each requirement 130 of the project being evaluated against the software products 165, the matching process starts (block 210) with finding identical or similar requirements from previous projects. Text mining and matching 215 may be used in block 210. Examples of possible techniques of text mining include U.S. Patent Publication no. 2012/0191740, entitled "Document Comparison" and U.S. Patent Publication no. 2005/0165600, entitled "System and Method for comparative analysis of textual documents". Many other examples of suitable text mining techniques may be found.

If at least one identical or similar requirement is found (block 220=Yes), and the requirement-software function match has previously been captured and stored in the knowledge database, the function or functions are also considered a match for the current requirement. This occurs in block 225, where the selected requirement is stored (if necessary) with references to similar requirements and to matching functions and products. For instance, if the requirement 130-1 of "Online store performance analysis" is not stored in the requirement 170-1 (see table 191 of FIG. 1B), the text of "Online store performance analysis" could be stored, as being judged a similar requirement to "Analyzes performance of online store", in the requirement 170-1, e.g., using a reference 198. If the requirement 130-1 of "Online store performance analysis" is already stored in the requirement 170-1 (as is shown in table 191 of FIG. 1B), then there is no need to store an additional requirement 130-1 in block 225.

When more than one similar requirement is found for a selected requirement and different functions are associated with each (block 230=Yes), then it is up to the consultant to make a decision as to which function(s) are the most appropriate for satisfying the selected requirement. This is illustrated by block 235, where the software fitting assessment tool 135 has the consultant make a decision as to which function(s) are the most appropriate for satisfying the selected requirement. This may be performed by presenting a message on a user interface (see, e.g., FIG. 3) in order to have the consultant choose the most appropriate function(s) for satisfying the selected requirement. In an exemplary embodiment, human matching takes precedence over machine matching this would mean replacing the old matching results with new ones.

After block 225, or if more than one similar requirement is not found with different functions (block 230=No), or if there were no identical or similar requirements in the knowledge based repository 155 (block 220=No), the method proceeds to block 240. Note that block 240, performed after blocks 225 and 230, ensures that new functions 160 are also associated with requirements 130/170.

A second step (as represented by block 240) necessitates finding matches directly between requirements 170 and function(s) 160. However, even if a match is found in the first step (block 210), a validation still needs to be performed to see if the function remains in the present version of the software product 165. When software updates occur, the matches ought to be updated in the repository. If there is a failure to update cross-references, e.g., requirements-to-functions (shown as mapping 171 in FIG. 1B), the system may not properly function. Therefore, the extra validation is useful for the system's robustness.

If no requirement-to-software-function match is found (block 250=No), the software fitting assessment tool 135 presents (block 255) the requirement 130 to the consultant 120 (e.g., via a user interface) so that the consultant 120 may manually associate a software function or functions 160 with a requirement 130. As shown in FIG. 1, this provides a matching result 125 that is stored (block 260) in the knowledge based repository 155. If there are matches with function(s) of product(s) (block 250=Yes), in block 265, mapping 171 is updated/created to match function(s) 160 with the matched requirements(s) 170.

In regard to the retailer's web store, assume that automatic matching of catalog requirements 130 to functions 160 results in a relatively accurate match. Requirements such as "Display products", "Display price", "Add a product to a shopping cart", "Add a product to compare view", and the like have found their counterparts among requirements from previous projects and their corresponding functions. "Catalog" is one of major subsystems in any web store. Other core subsystems are 'Member Management", "Order Capture", "Order Management", "Post Order Management". The requirements 130 are therefore not limited to catalog requirements, but such requirements are useful to illustrate the exemplary embodiments. A few of the project's catalog requirements such as "Change color of product" and "Color change causes price update" were marked as stray (i.e., not found) because 1) a match was not found for these requirements among previous project requirements (i.e., in portion 185 of the knowledge based repository 155), and 2) the requirements could not be matched to the given software functions in the knowledge based repository 155 (i.e., in portion 190 of the knowledge based repository 155).

The third step (block 270) is to present the matching results to the consultant in order that he or she may decide whether to reject the match (block 280), edit the match (block 285), create a new match (block 290), or accept the match (block 295) between a requirement and function(s). All matches, whether automated or manual by the consultant, get stored and/or updated (block 275) as accumulated knowledge for future use. In an exemplary embodiment, all matches made by a consultant 120 take precedence over automatic matches. If a consultant 120 rejects a match, for instance, the mapping 171 from the requirement(s) 170 to the function(s) 160 gets removed from the repository 155. New and edited matches alter the mappings 171 in the repository 155.

Exemplary embodiments of the instant invention provide a number of techniques for dealing with stray requirements 130. In some embodiments, the software fitting assessment tool 135 performs (see block 410 of FIG. 2B) proposing functions to address stray requirements to the customer (e.g., client 105), along with cost estimates and a timetable for developing the requirements as software tracking projects having a requirement not satisfied by software functions. At that point the customer (e.g., client 105) and consultant 120 can enter into a negotiation regarding this. It is the job of the consultant to perform cost estimates for developing customized software, which will cover the stray requirements for a customer. This process can be automated as well. The communicating can be performed via, e.g., a message presented on a user interface (see FIG. 3), a message via email, and the like. If, at the end of the project, new function(s) 160 are developed, their descriptions are mapped to the corresponding requirements 170 and added to the knowledge repository 155. In block 415, the software fitting assessment tool 135 may perform tracking projects having stray requirement(s) not satisfied by software functions, and if this number meets a threshold, communicating an indication that the stray requirement(s) has (have) not been met to, e.g., the business consultant and/or vendor(s). That is, if this number of projects meets a threshold, the software fitting assessment tool 135 performs communicating an indication that the requirement(s) has/have not been met. The threshold may be used in order to trigger the development of functions to cover that requirement. Software vendors may also be sent the indication, so that the software vendors can determine to whether or not to develop software having the functions. If new software product(s) 165 are developed, their functions will have descriptions that may be entered into the knowledge repository 155.

In other embodiments, if a stray requirement 130 is dropped from the project due either its low priority or high cost of function development, this drop is noted, and a threshold number is set for the number of projects that have to request this requirement in order to merit the development of new functions by software vendors.

Consultants 120 may find it useful to examine projects with similar attributes 196. In an exemplary embodiment of the invention, a project can be associated with attributes 196 such as industry (e.g., in which the project takes place), geography (e.g., where the project occurs), company's market capitalization (e.g., for the company performing the project), and others. These attributes 196 may be stored. See block 420 of FIG. 2B.

Automatically comparing requirements (e.g., 130 and/or 110) of the project with requirements 170 of projects having comparable attributes 196 and/or requirements may identify requirements that can be recommended as 'cross-sell'. See block 430 of FIG. 2B, where the software fitting assessment tool 135 performs storing mappings between stored requirements and stored projects, comparing the one or more specified requirements for the specified project with the stored requirements for stored projects, indicating to the user one or more recommendations of one or more 'cross-sell' requirements in response to one or more requirements not submitted by a user for the specified project being stored in one or more stored projects that are determined to be similar to the specified project. For example, a project to set up a web store for a pet products company in the United States has a set of "campaigning" requirements (specifically, segmentation requirements). Those requirements get automatically compared to a set of requirements from a previous project performed for another pet products company with similar attributes (see block 440). It is noted that techniques other than attributes 196 may be used, such as storing names of projects 147 and performing text matching to determine whether two projects are similar or the same. After comparing the matched segmentation requirements, it turns out that one of the previous project's requirements—"offer bird accessories in personalized ads based on customer's profile" was identified as a possible recommendation for a "cross-sell."

The same automatic comparison can also reveal that one function 160 of the marketing product supported two requirements 170 in the previous project, but matched only one requirement (e.g., 130) in the current project. The second requirement had simply not been submitted. In this case the second requirement can be suggested as a "free addition" to the project's requirements (e.g., 130).

Block 445 of FIG. 2B illustrates another example. In block 445, the software fitting assessment tool 135 performs indicating to the user (e.g., the consultant 120) recommendations of requirements not submitted by the user in the requirements 130 but supported by functions 160 that have already been matched to satisfy the requirements 130. For instance, if the user submits requirement R1, and the software fitting assessment tool 135 determines that function F1 matches the requirement R1 but also matches requirement R2, then the requirement R2 would be indicated to the user.

Block 450 is another example. In block 450, the software fitting assessment tool 135 can perform determining popularity of one or more requirements 170 by performing one or more queries across projects 147 stored in the repository 155, and indicating the determined popularity and corresponding popular one or more requirements to a user. This could be used, for instance, for marketing purposes, so that a user can determine a particular software product 165 is popular. This may also be used, in combination with matching specified requirements 130 with stored requirements 170 and with corresponding products 165, to indicate for particular requirements that some products 165 are more popular than other products 165 for these requirements.

Figure 3:
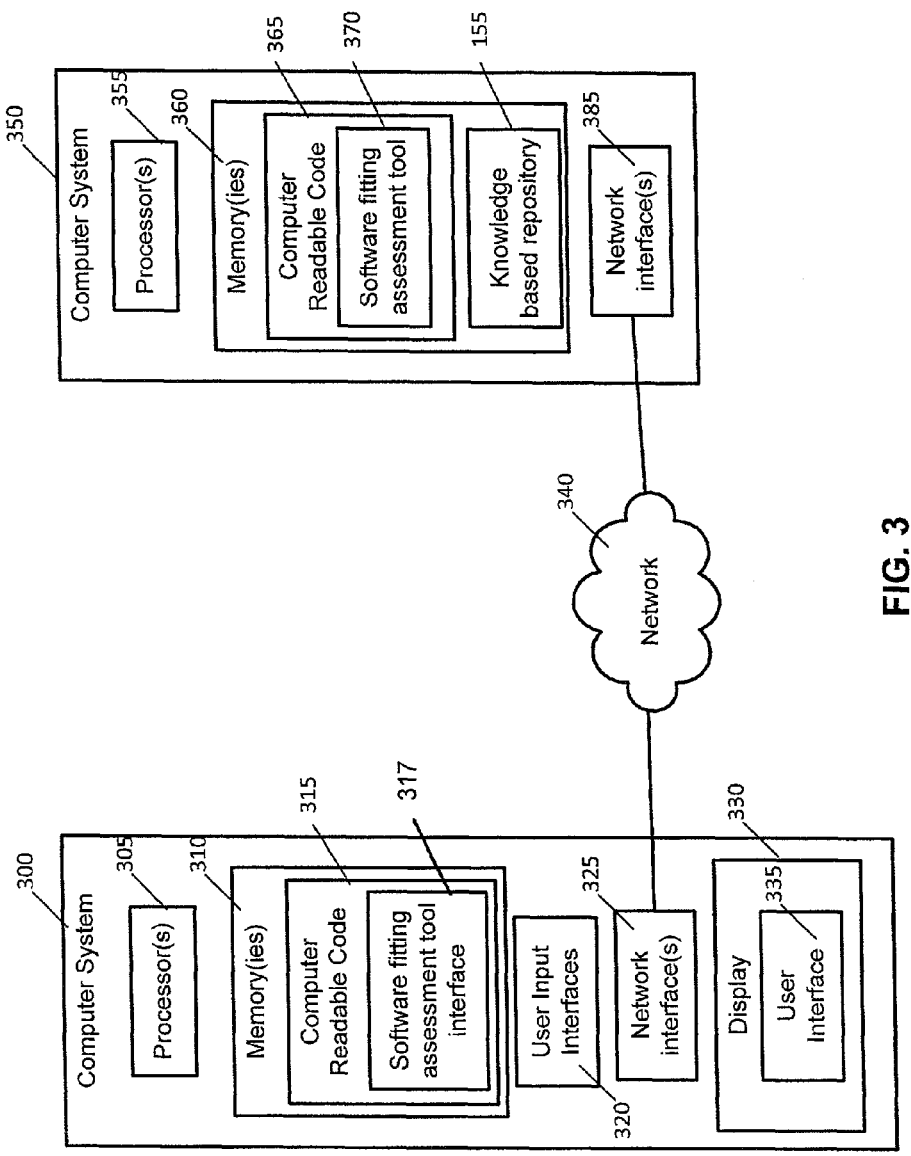
FIG. 3 is a block diagram of a system suitable for performing exemplary embodiments of the instant invention.

Turning to FIG. 3, an exemplary system is shown that suitable for performing exemplary embodiments of the invention. This system comprises a computer system 300 comprising one or more processors 305, one or more memories 310, one or more user input interfaces 320 (e.g., touchscreen interfaces, mouse interfaces, keyboard interfaces, and the like) and one or more network interfaces 325. The computer system 300 comprises (as shown in FIG. 3) or is coupled to a display 330 having a user interface 335 through which a consultant 120 can view the requirements 110, 130, and the requirements 140, functions 145, matching results 150, and also provide input for the computer system 300 for, e.g., blocks 235, 255, 280, 285, 290, and 295. The one or more memories 310 include computer readable code 315 that comprises a software fitting assessment tool interface 317.

This example is a networked example, where the computer system 300 communicates with another computer system 350 comprising one or more processors 355, one or more memories 360, and one or more network interfaces 385. The one or more memories 360 comprise computer readable code 365 comprising a software fitting assessment tool 370, which is a version of the software fitting assessment tool 135 previously described. The one or more memories 360 also comprise the knowledge based repository 155. The computer systems 300, 355 communicate via a network 340, e.g., the Internet. In this example, the computer system 300 is a client and the computer system 350 is a server. The software fitting assessment tool interface 317 may be as simple as a Web interface to the software fitting assessment tool 370, or could be more complex, such as an applet or client program. In this example, the software fitting assessment tool 317 then provides interaction with the business consultant 120, e.g., using the user interface 335. Operations such as storing, searching, and matching are performed by the software fitting assessment tool 370. For instance, the software fitting assessment tool 370 could perform all of the blocks in FIGS. 2A, 2B, except those blocks requiring some type of interaction with the consultant 120. For the blocks requiring interaction, these are performed at least in part by the software fitting assessment tool 317, using information delivered by the software fitting assessment tool 370 using the network 340, and the user interface 335.

Another exemplary embodiment may be used where there is only a single software fitting assessment tool 135 on a single computer system (e.g., 300) used by the consultant 120. In this embodiment, the knowledge based repository 155 also may be part of the same computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, web technologies such as JavaScript, Adobe Flash, AJAX or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
   one or more memories comprising computer readable code; and
   one or more processors in response to execution of the computer readable code causing the apparatus to perform at least the following:
      automatically matching on a computer system one or more specified requirements for a project with one or more software functions stored in a repository, the automatically matching comprising mining the repository in order to match requirements, where the repository comprises software functions, requirements accumulated from previous projects, and results of stored matches between the software functions and the requirements accumulated from previous projects; and
      outputting by the computer system one or more results of the matching, wherein the one or more processors in response to execution of the computer readable code further cause the apparatus to perform at least the following:
         subsequent to outputting the one or more results, providing a consultant an opportunity to reject a match between a specified requirement and one or more software functions, edit the match, create a new match, or accept the match:
            wherein in response to rejecting the match, removal from the repository of a mapping between the specified requirement and the rejected one or more software functions;
            wherein in response to editing the match, editing a mapping in the repository to correspond to the editing of the match; or wherein in response to creating a new match, adding a mapping in the repository corresponding to the new match.

2. An apparatus, comprising:
one or more memories comprising computer readable code; and
one or more processors in response to execution of the computer readable code causing the apparatus to perform at least the following:
automatically matching on a computer system one or more specified requirements for a project with one or more software functions stored in a repository, the automatically matching comprising mining the repository in order to match requirements, where the repository comprises software functions, requirements accumulated from previous projects, and results of stored matches between the software functions and the requirements accumulated from previous projects; and
outputting by the computer system one or more results of the matching, wherein for a particular one of the one or more specified requirements, the automatically matching does not find a match, and wherein the one or more processors in response to execution of the computer readable code further cause the apparatus to perform at least the following: presenting the particular specified requirement to a consultant for a manual matching, and storing a result of the manual matching as one of the results of stored matches between the software functions and the requirements accumulated, from previous projects.

3. The apparatus of claim 2, wherein requirements accumulated from previous projects are also at least partially described by text, and wherein performing text mining further comprises performing text mining of the requirements accumulated from previous projects to match the one or more specified requirements with the requirements accumulated from previous projects.

4. The apparatus of claim 3, wherein text mining further comprises performing text mining of the requirements accumulated from previous projects to match the one or more specified requirements with same or similar requirements accumulated from the previous projects.

5. The apparatus of claim 4, wherein one or more of the requirements accumulated from previous projects comprise one or more references to equivalent text forms.

6. The apparatus of claim 4, wherein the one or more processors in response to execution of the computer readable code further cause the apparatus to perform at least the following: in response to multiple similar requirements being found from the requirements accumulated from previous projects to match a particular one of the one or more specified requirements, but wherein the multiple similar requirements correspond to multiple different functions, providing a consultant with an option to make a decision as to which of the multiple different functions are most appropriate for satisfying the particular requirement and storing any results of the decision in the repository.

7. The apparatus of claim 6, wherein providing a consultant with an option make a decision further comprises presenting a message on a user interface of a display in order to have the consultant choose which of the multiple different functions are the most appropriate function or functions for satisfying the particular requirement.

8. The apparatus of claim 2, wherein for a particular one of the one or more specified requirements, the automatically matching does not find a match, and wherein the one or more processors in response to execution of the computer readable code further cause the apparatus to perform at least the following: presenting the particular specified requirement to a consultant for a manual matching, and storing a result of the manual matching as one of the results of stored matches between the software functions and the requirements accumulated from previous projects.

9. The apparatus of claim 2, wherein the results comprise specified requirements and the corresponding matched software functions.

10. The apparatus of claim 9, wherein the repository further comprises software products and mapping between the software products and corresponding software functions, and wherein the results further comprise indications of software products corresponding to the matched software functions.

11. The apparatus of claim 2, wherein the one or more processors in response to execution of the computer readable code further cause the apparatus to perform at least the following: proposing functions to address one or more stray requirements not satisfied by any existing software functions along with proposed cost estimates and a timetable for developing the one or more stray requirements as customized software.

12. The apparatus of claim 11, wherein the one or more processors in response to execution of the computer readable code further cause the apparatus to perform at least the following: tracking projects having the one or more stray requirements, and, in response to a number of tracked projects meeting a threshold, communicating to vendors a proposal to develop the one or more stray requirements as one or more product software functions.

13. The apparatus of claim 2, wherein the one or more processors in response to execution of the computer readable code further cause the apparatus to perform at least the following: storing one or more attributes of a project in the repository, where the attributes comprise one or more of industry in which the project takes place, geography in which the project takes place, or market capitalization of a company performing the project.

14. The apparatus of claim 13, wherein the project is a specified project submitted by a user and the one or more specified requirements have been submitted by the user, and wherein the one or more processors in response to execution of the computer readable code further cause the apparatus to perform at least the following: comparing the one or more specified requirements for the specified project with stored requirements for stored projects, and indicating to the user one or more recommendations of one or more requirements based on a comparison of the one or more specified requirements with requirements of previous projects whose attributes are similar to the specified project.

15. The apparatus as in claim 13, wherein the project is a specified project submitted by a user and the one or more specified requirements have been submitted by the user, and wherein the one or more processors in response to execution of the computer readable code further cause the apparatus to perform at least the following: comparing the one or more specified requirements for the specified project with stored requirements for stored projects, indicating to the user one or more recommendations of one or more "cross-sell" requirements in response to one or more requirements not submitted by the user for the specified project being stored in one or more stored projects that are determined to be similar to the specified project.

16. The apparatus of claim 2, wherein the one or more specified requirements have been submitted by a user, and wherein the one or more processors in response to execution of the computer readable code further cause the apparatus to perform at least the following: indicating to the user one or more recommendations of one or more requirements not submitted by the user in the one or more specified requirements but supported by functions that have already been matched to satisfy the one or more specified requirements.

17. The apparatus of claim 2, wherein the one or more processors in response to execution of the computer readable code further cause the apparatus to perform at least the following: determining popularity of one or more requirements by performing one or more queries across projects stored in the repository, and indicating the determined popularity and corresponding popular one or more requirements to a user.

18. The apparatus of claim 2, wherein the software functions are described using at least text.

19. The apparatus of claim 18, wherein the one or more specified requirements comprise text describing the corresponding requirements, and wherein mining further comprises performing text mining of the software functions in the repository to match the one or more specified requirements with the software functions.

20. The apparatus of claim 19, wherein the one or more processors in response to execution of the computer readable code further cause the apparatus to perform at least the following: in response to a match between a selected one of the one or more specified requirements and a specific one of the software functions, storing the match as a stored match between the selected specified requirement and the specific software function.

21. The apparatus of claim 19, wherein at least some of the software functions are described though artifacts and wherein performing text matching further comprises performing text mining of the artifacts for the at least some of the software functions in the repository to match the one or more specified requirements with the software functions.

22. The apparatus of claim 21, wherein the artifacts comprise one or more of product documentation of a software product having the software function, presentations about the software product, customization details of the software product, or configurations of the software product.

23. A method, comprising:
  automatically matching on a computer system one or more specified requirements for a project with one or more software functions stored in a repository, the automatically matching comprising mining the repository in order to match requirements, where the repository comprises software functions, requirements accumulated from previous projects, and results of stored matches between the software functions and the requirements accumulated from previous projects; and
  outputting by the computer system one or more results of the matching, wherein for a particular one of the one or more specified requirements, the automatically matching does not find a match, and wherein the one or more processors in response to execution of the computer readable code further cause the apparatus to perform at least the following: presenting the particular specified requirement to a consultant for a manual matching, and storing a result of the manual matching as one of the results of stored matches between the software functions and the requirements accumulated from previous projects.

24. A computer program product embodied on a non-transitory computer readable storage medium storing computer readable program code embodied which, when being executed by a computer, is configured to provide instructions to control or carry out:
  automatically matching on a computer system one or more specified requirements for a project with one or more software functions stored in a repository, the automatically matching comprising mining the repository in order to match requirements, where the repository comprises software functions, requirements accumulated from previous projects, and results of stored matches between the software functions and the requirements accumulated from previous projects; and
  outputting by the computer system one or more results of the matching, wherein for a particular one of the one or more specified requirements, the automatically matching does not find a match, and wherein the one or more processors in response to execution of the computer readable code further cause the apparatus to perform at least the following: presenting the particular specified requirement to a consultant for a manual matching, and storing a result of the manual matching as one of the results of stored matches between the software functions and the requirements accumulated from previous projects.

\* \* \* \* \*